(12) United States Patent
Dugan et al.

(10) Patent No.: US 10,183,316 B2
(45) Date of Patent: Jan. 22, 2019

(54) SUSTAINED RELEASE REACTANT BLENDS

(71) Applicant: Carus Corporation, LaSalle, IL (US)

(72) Inventors: Pamela J. Dugan, Ottawa, IL (US);
Sean Davenport, Ottawa, IL (US);
Mohamadkheir Alkhateeb, Brookfield, WI (US)

(*) Notice: Subject to any disclaimer, the term of this patent is extended or adjusted under 35 U.S.C. 154(b) by 137 days.

(21) Appl. No.: 14/776,811

(22) PCT Filed: Mar. 14, 2014

(86) PCT No.: PCT/US2014/029247
§ 371 (c)(1),
(2) Date: Sep. 15, 2015

(87) PCT Pub. No.: WO2014/144718
PCT Pub. Date: Sep. 18, 2014

(65) Prior Publication Data
US 2016/0030988 A1    Feb. 4, 2016

Related U.S. Application Data

(60) Provisional application No. 61/793,464, filed on Mar. 15, 2013.

(51) Int. Cl.
*B09C 1/00*    (2006.01)
*B09C 1/08*    (2006.01)
(Continued)

(52) U.S. Cl.
CPC ............ *B09C 1/002* (2013.01); *B09C 1/08* (2013.01); *C02F 1/72* (2013.01); *B09C 2101/00* (2013.01);
(Continued)

(58) Field of Classification Search
None
See application file for complete search history.

(56) References Cited

U.S. PATENT DOCUMENTS 4,729,834 A    3/1988  Itoh et al.
5,275,739 A    1/1994  Grant et al.
(Continued)

FOREIGN PATENT DOCUMENTS

| CN | 102491425 | 6/2012 |
| WO | 2012/104639 | 8/2012 |
| WO | 2012/140520 | 10/2012 |

OTHER PUBLICATIONS

Agemian, Haig et al.; A semi-automated method for the determination of selenium in soils and sediments; Analytica Chimica Acta; vol. 119, Issue 2, Oct. 1, 1980.
(Continued)

*Primary Examiner* — Joseph D Anthony
(74) *Attorney, Agent, or Firm* — Clark Hill PLC (57) ABSTRACT

There is provided according to the present invention a sustained release reactant blend and methods for making the sustained release reactant blends. There is further provided methods for using such blends in the in situ or ex situ remediation of contaminated groundwater and in the treatment of water and wastewater. There is further provided, according to the present invention, methods for controllably coating reactant blends whereby such coated blends exhibit sustained release properties and have an open structure.

13 Claims, 7 Drawing Sheets

(51) Int. Cl.
*C02F 1/72* (2006.01)
*C02F 101/32* (2006.01)
*C02F 103/06* (2006.01)

(52) U.S. Cl.
CPC .... *C02F 2101/322* (2013.01); *C02F 2103/06* (2013.01)

(56) References Cited

U.S. PATENT DOCUMENTS

| | | | |
|---|---|---|---|
| 5,570,973 | A | 11/1996 | Hunt |
| 5,589,194 | A | 12/1996 | Tsuei et al. |
| 5,833,739 | A * | 11/1998 | Klatte .................. B01D 46/00 210/691 |
| 5,975,800 | A | 11/1999 | Edwards et al. |
| 6,019,548 | A | 2/2000 | Hoag et al. |
| 6,107,079 | A | 8/2000 | Yadav et al. |
| 6,275,739 | B1 | 8/2001 | Ireland |
| 6,277,408 | B1 | 8/2001 | Wellinghoff et al. |
| 6,620,611 | B2 | 9/2003 | Hince |
| 7,160,483 | B1 | 1/2007 | Hince |
| 7,503,143 | B2 | 3/2009 | Krysiak et al. |
| 7,514,019 | B2 | 4/2009 | Martin |
| 8,519,061 | B2 | 8/2013 | Luster-Teasley |
| 2003/0029792 | A1 | 2/2003 | Kerfoot |
| 2003/0035691 | A1 | 2/2003 | Sivavec et al. |
| 2003/0069142 | A1 | 4/2003 | Beal |
| 2003/0143030 | A1 | 7/2003 | Greenberg |
| 2009/0018046 | A1 * | 1/2009 | Hoyt ....................... C11D 3/39 510/375 |
| 2009/0061082 | A1 * | 3/2009 | Swearingen ............. B01J 13/04 427/220 |
| 2011/0174743 | A1 | 7/2011 | Huang |
| 2011/0195875 | A1 * | 8/2011 | Swearingen ............ B09C 1/002 507/214 |
| 2011/0210080 | A1 * | 9/2011 | Kumakiri ............. B01D 69/145 210/748.09 |
| 2011/0262559 | A1 * | 10/2011 | Luster-Teasley ......... B09C 1/08 424/640 |

OTHER PUBLICATIONS

Barber et al.; Chemical Control of Hydrogen Sulfide from Anaerobic Swine Manure; Canadian Agricultural Engineering, vol. 17, No. 2, Dec. 1975.
Christenson, Mark D. et al.; Using slow-release permanganate candles to remove TCE from a low permeable aquifer at a former landfill; Papers in Natural Resources, Paper 330, 2012.
Negrao, Paulo et al.; Sustained-Release Oxidant Technology; Carus Corporation; 2013.
Dugan, Pamela D.; Sustained-Release Permanganate: Reactive Barriers for Green and Sustainable Remediation; Carus Corporation; 2011.
Hua, Inez et al.; Remediation of Soils and Ground Water Contaminated by Aromatic and Chlorinated Hydrocarbons and Metals; Purdue University; 2004.
ITRC (The Interstate Technology & Regulatory Council); Technical and Regulatory Guidance for In Situ Chemical Oxidation of Contaminated Soil and Groundwater; Jan. 2005.
Kambhu, Ann et al.; Developing slow-release persulfate candles to treat BTEX contaminated groundwater; Chemosphere, vol. 89, Issue 6; Oct. 2012.
Kang, Namgoo et al.; Production and Characterization of Encapsulated Potassium Permanganate for Sustained Release as an in Situ Oxidant; Ind. Eng. Chem. Res., vol. 43; 2004.
Lee et al.; Characterization of controlled-release KMnO4 (CRP) barrier system for groundwater remediation: A pilot-scale flow-tank study; Chemosphere, vol. 71; 2008.
Rauscher, Lindy et al.; Using slow-release permanganate candles to remediate PAH-contaminated water; Papers in Natural Resources; 2012.
Ross, Chapman et al.; Characteristics of Potassium Permanganate Encapsulated in Polymer; Journal of Environmental Engineering; Aug. 2005.
Wang, Sze-Kai; In situ chemical oxidation of TCE-contaminated groundwater using slow permanganate-releasing material; 2011.
Luster-Teasley, Stephanie et al.; Development of Slow-release Chemical Oxidation Methods for Environmental Remediation; 2009.
Yuan, Baoling et al.; Laboratory-scale column study for remediation of TCE-contaminated aquifer using three-section controlled-release potassium permnganate (CRP) barriers; 2012.

* cited by examiner

SUSTAINED RELEASE REACTANT BLENDS

PRIORITY

This application is a National Phase filing regarding International Application No. PCT/US2014/029247, filed on Mar. 14, 2014. International Application No. PCT/US2014/029247 claims priority from U.S. Provisional Patent Application No. 61/793,464, filed Mar. 15, 2013.

FIELD OF THE INVENTION

The present invention relates to methods for making sustained release reactant blends and the use of such blends in the in situ or ex situ remediation of contaminated groundwater and soil, and in the treatment of water and wastewater. The present invention further relates to methods for controllably coating reactant blends whereby such coated blends exhibit sustained release properties.

BACKGROUND OF THE INVENTION

The in situ cleanup of soil and groundwater to remove contaminants has invited many attempts. The intention behind site cleanup is inherently green; however, remedial activities use energy, water, and material resources to achieve cleanup objectives. Traditional remediation technologies (e.g., pump and treat, air sparging, soil vapor extraction, or multiphase extraction) require electricity and fossil fuel to power equipment to remove contamination from soil and ground water. Extracted fluids are then processed aboveground, or disposed of in landfills when filters are used. The intractable nature of subsurface contamination suggests the need to explore the use of innovative technologies that reduce the environmental footprint of remedial treatments. Reactive materials in permeable reactive barriers (PRBs) have proven very useful for transforming or destroying organic waste in situ. Once emplaced they typically do not require a continued supply of electrical power and have the added benefit of creating a reactive zone for the destruction of contaminants in place.

Controlled-release techniques have been utilized extensively in diverse fields such as pharmaceutical and agrochemical technologies. However, controlled and sustained release of an oxidant during in situ chemical oxidation (ISCO) is an emerging concept that is extremely relevant to the field of environmental remediation, yet to-date has received little attention. ISCO using the oxidants permanganate, persulfate, and catalyzed hydrogen peroxide has shown great promise for remediation of many recalcitrant organic contaminants of concern (COC). Because the oxidant also reacts with natural organic matter, inorganic soil constituents, and other reduced compounds, the presence of a protective barrier that controls oxidant release may enhance the efficiency of ISCO and allow for long-term, low-cost treatment of chlorinated solvents. To this end, sustained release potassium permanganate and slow-release activated sodium persulfate were developed. Slow-release permanganate and activated persulfate have been demonstrated to be effective for sustained-removal of organic contaminants in both laboratory and field efforts (e.g., Dugan, et al., 2013; Christensen, et al., 2012; Khambu, et al., 2012). Paraffin wax was used as the environmentally benign and biodegradable matrix material for solid potassium permanganate ($KMnO_4$) or sodium persulfate ($NaS_2O_8$) particles. The paraffin wax matrix protects the solid permanganate or persulfate particles from instant dissolution and facilitates slow-release of the oxidant over long periods of time. The sustained release oxidant materials contain between 65%-85% permanganate or persulfate and can be formed as cylinders for direct push applications in reactive barriers, or chipped material for hydro-fracturing into low permeability media.

The prior art has demonstrated that the permanganate concentrations will initially be high when flow is introduced to the system, however after short periods of time the oxidant concentrations decrease to unfavorable levels. As presented in FIG. 2, for example, permanganate concentrations may drop to a few hundred parts per million (or less) within a few months which results in incomplete degradation of organic contaminants due to decreased concentrations of the oxidant over time.

Coated oxidants have been proposed for use in in situ remediation of groundwater and ex situ treatment of water and wastewater. Wax coated potassium permanganate pellets, for example, have been suggested for injection into contaminated groundwater. It is suggested that the contaminants in the groundwater will dissolve the wax and that the thus exposed potassium permanganate will then oxidize the contaminants. U.S. Pat. No. 7,431,849. The potassium permanganate, or other oxidant, or combination of oxidants, in the pellets, is completely coated prior to contacting the contaminants in the groundwater. As provided in the prior art: "[W]hen the coated reactant is contacted with or exposed to the contaminants it dissolves, reacts, or absorbs at least one of the targeted compound(s) found in the media and exposes at least one reactant to the targeted compounds where it may react." Id.

It has been hypothesized that wax coated permanganate when used to oxidize contaminated groundwater did so either by diffusion of the contaminant through the wax coating surrounding the potassium permanganate or by dissolution of the wax coating by the contaminant, thus exposing the potassium permanganate. "The Characteristics of Potassium Permanganate Coated in Polymer," Ross, C. M., Thesis (M. S.), Clemson University (2001). The study sought to make completely coated permanganate.

Wax coated potassium permanganate cylinders have also been suggested for insertion into contaminated groundwater. "Using Slow-release Permanganate Candles to Remove TCE From a Low Permeable Aquifer at a Former Landfill," Christenson, Mark D., et al., University of Nebraska-Lincoln, Oct. 1, 2012. The cylinders, also referred to as "candles," are made by adding heated potassium permanganate to melted paraffin wax and then mixing the melted wax and potassium permanganate until all of the potassium permanganate is blended with the wax.

Combinations of solid oxidants coated in a dissolvable matrix, such as a wax matrix, have been proposed for use in in situ remediation of contaminated groundwater. U.S. Pat. No. 7,431,849. In this instance, a first oxidant is first coated with wax, then with a second oxidant, and the combination is then coated with wax. The resulting particle is multilayered with layers of oxidant separated by wax. Id.

Combinations of liquid oxidants have been used for in situ treatment of groundwater. It has been reported that a solution of potassium permanganate and a solution of sodium persulfate may be added simultaneously or serially to oxidize contaminants in situ in groundwater. U.S. Pat. No. 6,474,908. According to the prior art, the soil oxidant demand is satisfied by the sodium persulfate and volatile organic compounds are oxidized by the potassium permanganate. Id.

It appears that the prior art relies on either completely coated oxidants or liquid oxidants, whether a single oxidant or multiple oxidants are used for treatment of contaminated water and wastewater. The coated reactants of the prior art tend to release the coated oxidants at an unsteady rate which, in some instances, may be dependent on the time it takes for the groundwater contaminant to dissolve the encapsulant and expose the oxidant. If the dissolution of the encapsulant occurs slowly, then the oxidant concentration released from the coated reactant will be initially low with a sudden increase once dissolution of the encapsulant is well under way. If the encapsulant dissolves quickly, then the oxidant will be substantially released initially and then the concentration of oxidant will quickly diminish over time. When applied to the in situ treatment of contaminated groundwater, such prior art coated reactants may not be effective in substantially reducing the contaminant concentration because of the unsteady release of oxidants.

Accordingly, what is needed is a coated oxidant that provides for a steady or essentially uniform release of oxidants into contaminated water or wastewater. What is also needed is a coated oxidant that includes a combination of oxidants, such as potassium permanganate and sodium persulfate, and provides for a steady or essentially uniform release of oxidants into contaminated water or wastewater.

SUMMARY OF THE INVENTION

The present invention provides a combined sustained release reactant comprising: a first reactant; a second reactant; and a matrix; wherein the first reactant and the second reactant are incompletely coated by the matrix such that the combination of matrix, first reactant and second reactant forms an open structured mass.

The present invention further provides a combined sustained release oxidant comprising: potassium permanganate; sodium persulfate; and paraffin wax; wherein the paraffin wax provides a coating for the potassium permanganate and the sodium persulfate such that the sustained release oxidant is an open structured mass.

The present invention further provides a process for making a combined sustained release reactant, the process comprising: selecting a first reactant; selecting a second reactant; preparing a matrix, the prepared matrix capable of coating the first reactant and the second reactant; combining the first reactant, the second reactant and the prepared matrix by mixing to make a combination; allowing the combination to form the combined sustained release reactant; wherein the combined sustained release reactant is characterized by the amount of potassium permanganate released during a standard assay of permanganate using sodium oxalate.

DETAILED DESCRIPTION

According to embodiments of the present invention, a blended configuration of potassium permanganate with persulfate in a paraffin wax matrix has demonstrated an unexpected and enhanced release of permanganate in laboratory experiments that is not realized when potassium permanganate is used alone in the wax matrix medium. As used herein, the release characteristics of the reactant blends of the present invention are described in terms of the amount of time a reactant continues to release from the matrix material when the reactant blend is exposed to a liquid, such as ground water. Regardless of the types of reactants or matrix materials used, such release characteristics are also referred to as "sustained reactant release." Embodiments of the present invention may be formed as cylinders, pellets, bee-bees, pastilles, pucks, grids, engineered forms, as-cast shapes and other shapes. Embodiments of the present invention are blends of potassium permanganate and sodium persulfate in a hydrocarbon matrix wherein the hydrocarbon matrix has an open structure which allows a portion of the reactants to be exposed. Unlike prior art coated oxidants which are completely coated, the coated oxidants of the present invention reside in an open structure hydrocarbon matrix, which makes the coated oxidant blends of the present invention more efficacious than the prior art. Further embodiments of the present invention include combined reactants contained in an open structure hydrocarbon matrix. Such coated combined reactants are particularly suited for use in treating contaminated water or wastewater.

Embodiments of the present invention are made by blending a quantity of potassium permanganate and sodium persulfate with a melted paraffin wax under agitation so as to form a structure which has exposed reactant particles when the mixture of oxidants and wax is cooled. By having an open structure, embodiments of the present invention make reactants immediately available for dissolution and diffusion when the structure is exposed to water. Coated oxidants of the present invention exhibit surprising sustained release of the oxidants in in situ remediation applications compared to fully encapsulated reactants and coated oxidants containing only potassium permanganate. Surprisingly, the combination of potassium permanganate and sodium persulfate in an open structure hydrocarbon matrix provides for a sustained release of the oxidants when the coated oxidant is exposed to water in either in situ or ex situ remediation, or in the treatment of drinking or wastewater.

Example 1

To manufacture 1000 grams of a sustained release coated oxidant of the present invention with 80% combined oxidant mass loading, 200 grams of a paraffin wax is melted in a jacketed mixing vessel at 140° F. To the melted paraffin wax, 400 grams of potassium permanganate and 400 grams of sodium persulfate are added and the wax is allowed to agitate at approximately 200 revolutions per minute for 20 to 30 minutes. After a homogeneous slurry is achieved the material is dispensed into a cardboard tube, capped, and allowed to cool until solidified. In a preferred embodiment, the total mass loading of oxidant ranges from 73% to 85% (weight per weight) which allows for higher oxidant release rates to be achieved as well as almost complete utilization of the oxidant when exposed to flowing water over time. The thus prepared cylinder has an open structure such that oxidant particles are not completely coated with wax. In making coated reactants of the present invention, the mixing of the slurry is controlled such that a sample of the coated reactants will release a reasonably predictable amount of potassium permanganate and sodium persulfate. Accordingly, manufacture of sustained release reactants can be controlled such that the open structure of the matrix is consistent from cylinder to cylinder. The methods of this Example 1 are applicable to other single reactants and other combinations of reactants, all of which are within the spirit and scope of the present invention.

Optionally, partially coated reactants of the present invention may be made using a single reactant, such as potassium permanganate, sodium persulfate, metal salts, sulfates, carbonates, ligands, phosphates, reductants, buffering reagents, carbon sources (e.g., carbohydrates, cyclodextrins) calcium nitrate, calcium peroxide, and lime, as unlimiting examples, such that the coated reactants are in a matrix, such as hydrocarbon, resin, polymeric, carboxymethyl cellulose, ethyl methylcellulose, gum arabic GG, gellan gum GK, gum karaya, gum tragacanth, hydroxyethyl cellulose, hydroxypropyl cellulose, hydroxypropyl methylcellulose, locust bean gum, methylcellulose, mesquite gum, polyvinylpyrrolidone, soluble soybean polysaccharide, cellulose, gum arabic, gum karaya, mesquite gum, galactomannans, soluble soybean, polysaccharide, fatty acids/alcohols, glycerides, waxes (carnauba, candelillia, beeswax, paraffin, cottonseed, canola), phospholipids, marine carrageenan, alginates, microbial/animal xanthan, gellan, dextran, chitosan, caseins, whey proteins, gelatin, hydrolyzed polyacrylamide, fatty acids/alcohols (e.g., steric, linoleic), glycerides, phospholipids, polyvinylpyrrolidone, polypropylene, polystyrene, polyvinylacetate, cyclodextrins, mineral oil, silicone oil, silicone wax, 580 WAX, ST WAX-30, AMS-C30, cosmetic wax, polylactic acid, methylcellulose, ethylcellulose, starch hydrolysates, polyphosphates, metal oxides (e.g., iron, manganese, silicon, aluminum) or other insoluble and biodegradable matrix, which has an open structure that allows a portion of the reactant to be exposed. As a general matter, the matrix materials of the present invention are insoluble, but biodegradable. Combinations of the aforementioned reactants, and other combinations, may also be used in a single coated mass made according to the principles of the present invention.

The porosity of the coated oxidant blends prepared according to the principles of the present invention is not alone responsible for the sustained release of the oxidants noted when the coated oxidant blends are tested. This will be illustrated by a comparison of FIGS. 1 through 4. Cylinders were made according to the method illustrated in Example 1 to contain either a combination of potassium permanganate and sodium persulfate, referred to as MULTIOX cylinders, or to contain only potassium permanganate or only sodium persulfate. For the studies which produced the data shown in FIGS. 1 through 4, cylinders of the diameters listed were prepared according to the method of Example 1. Thus, a label which provides "2.5 MULTIOX" or "2.5 inch $KMnO_4$" or just "2.5 inch" refers to a 2.5 inch diameter cylinder. FIGS. 1 through 4 indicate the concentrations of permanganate alone or persulfate alone in a MULTIOX cylinder piece loaded with a 50:50 ratio of oxidant on a weight per weight basis. It should be noted that the cylinder was used in the test that generated the results shown in FIGS. 3 and 4. Only the oxidant measured was changed. To aid in interpreting the data of FIGS. 1 through 4, the following table identifies the cylinders tested, the oxidants used and the loadings of each oxidant for the figures.

TABLE 1

Sample Identification

| FIG. Number | Oxidants Tested | Cylinder Diameters | $KMnO_4$ Loading (w/w) | $Na_2S_2O_8$ Loading (w/w) | Water Flow rate (mL/minute) |
|---|---|---|---|---|---|
| 1 | $Na_2S_2O_8$ | 2.5 inch | N/A | 72% and 75% | 0.6 |
| 2 | $KMnO_4$ | 1.35 and 2.5 inch | 80% | N/A | 0.75 |
| 3 | MULTIOX | 1.35 and 2.5 inch | 40% | 40% | 0.6 |
| 4 | MULTIOX | 1.35 and 2.5 inch | 40% | 40% | 0.6 |

The cylinders were cast in 18 inch lengths and then cut into 1 inch sections for use in testing. For the tests, a 1 inch section of each of the three types of cylinders were placed in individual columns through which deionized water flowed at the rates listed in Table 1. Periodically, the deionized water exiting each column was sampled and measured for potassium permanganate concentration and/or sodium persulfate concentration, depending on the type of cylinder in the respective column. Standard test methods were used to determine the concentration of potassium permanganate and sodium persulfate. The results of these tests are further described below.

Figure 1:
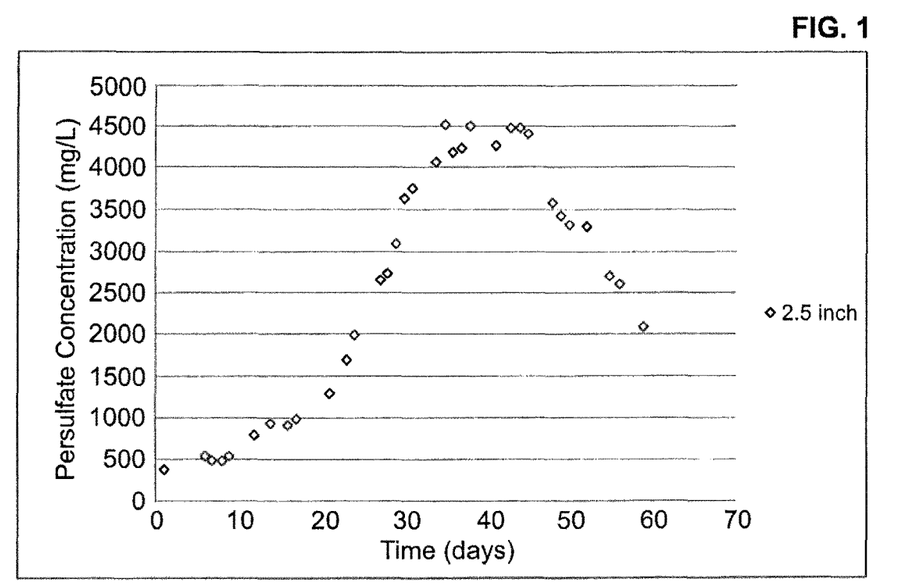
FIG. 1 is a chart illustrating the release of sodium persulfate in the absence of potassium permanganate from cylinders made according to the methods of the present invention.
Figure 2:
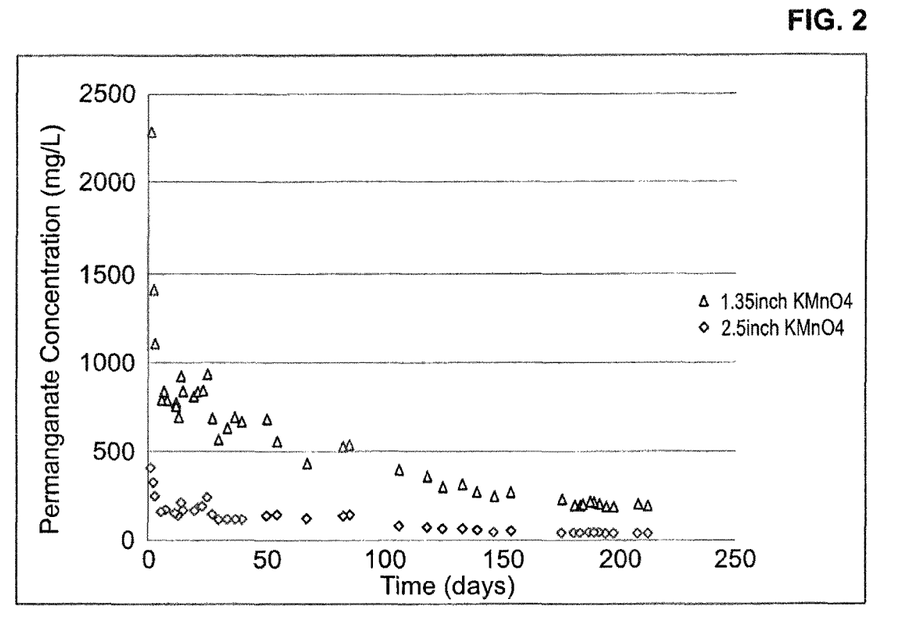
FIG. 2 is a chart illustrating the release of potassium permanganate in the absence of sodium persulfate from cylinders made according to the methods of the present invention.
Figure 3:
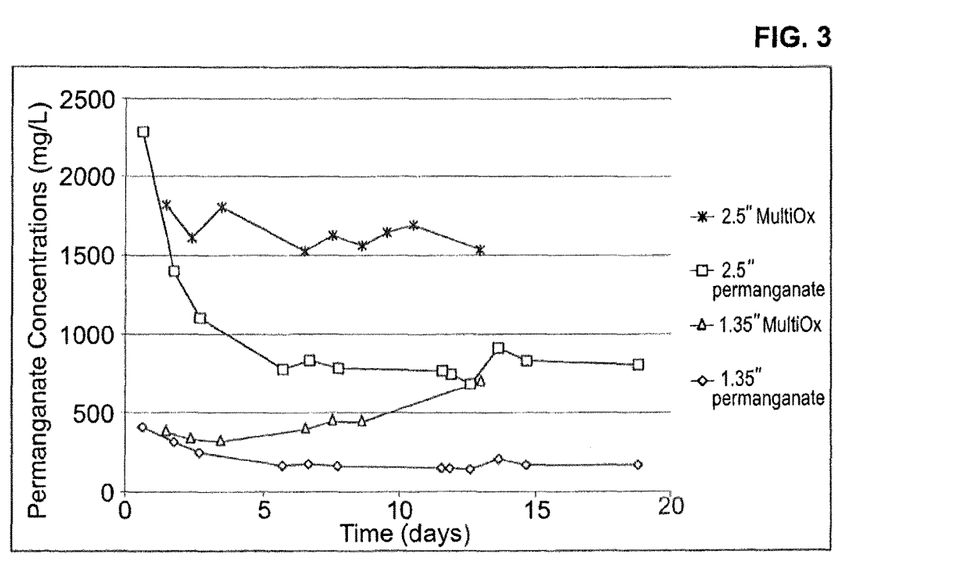
FIG. 3 is a chart illustrating the release of potassium permanganate in the presence of sodium persulfate from cylinders made according to the methods of the present invention.
Figure 4:
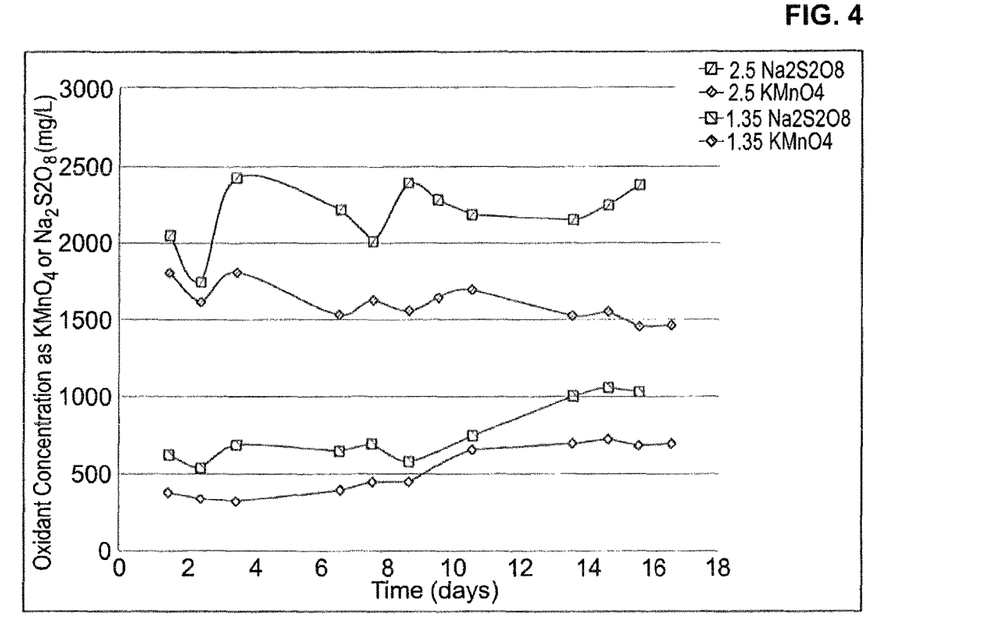
FIG. 4 is a chart illustrating the release of sodium persulfate in the presence of potassium permanganate from cylinders made according to the methods of the present invention.

FIG. 1 illustrates the release of sodium persulfate as a function of time from a sustained release test cylinder which contained only sodium persulfate. As shown, the sodium persulfate concentration is initially low, then peaks after more than 30 days, and then subsides. Additionally, FIG. 1 shows that the persulfate concentrations initially increase with time and reach higher oxidant concentrations as compared to permanganate. FIG. 2 illustrates the release of potassium permanganate as a function of time from sustained release test cylinders which contained only potassium permanganate. As can be seen from an examination of FIG. 2, there is a sudden initial release of potassium permanganate and then the concentration decreases over time for both cylinders of differing diameters. The release characteristics illustrated in FIGS. 1 and 2 are not optimal for treating contaminated water or wastewater, or for in situ or ex situ remediation because of the dramatic changes in concentrations of the oxidants. As shown in FIGS. 3 and 4, embodiments of the present invention surprisingly exhibit a sustained release of permanganate and sodium persulfate over time. For example, FIG. 3 shows permanganate release from a blend of sustained release oxidants (50:50 blend of permanganate and persulfate). As can be seen from an examination of FIG. 3, permanganate concentrations are higher in the MULTIOX cylinder as compared to the permanganate alone cylinders for both 1.35 and 2.5 inch diameter cylinder pieces. FIG. 4 also shows permanganate and persulfate concentrations in MULTIOX sustained release cylinders.

Figure 5:
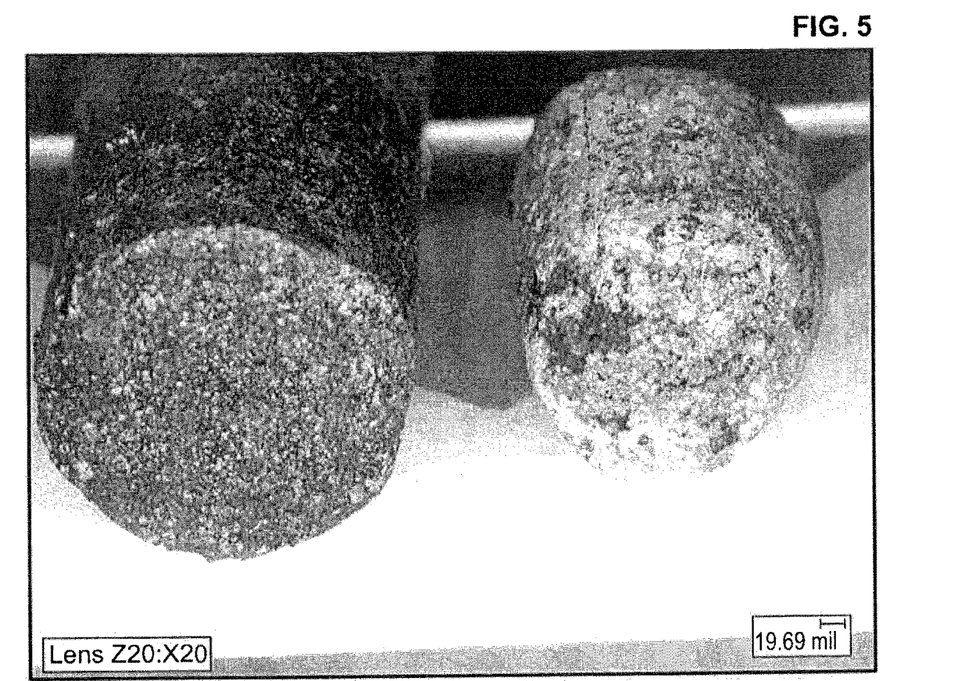
FIG. 5 is a photograph of a MULTIOX cylinder before and after testing.
Figure 6:
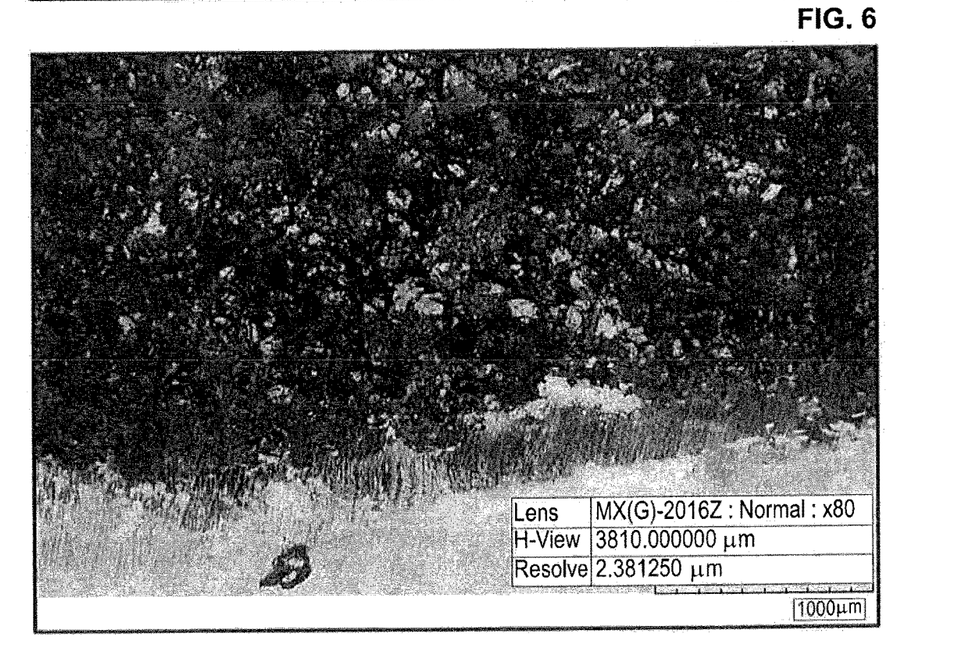
FIG. 6 is a photograph of a prior art coated oxidant taken after testing.

Embodiments of the present invention were tested for release of oxidant under flowing water. A cylinder of partially coated oxidants was prepared as described in Example 1. The control for the test was a same-sized cylinder containing potassium permanganate that was completely coated by paraffin wax. The tests were conducted at room temperature. After exposure to flowing water for six months, the depletion of oxidants from the cylinder prepared according to Example 1 is readily apparent upon visual inspection of the cylinder, as shown in FIG. 5. Also shown in FIG. 5 is a photograph of the cylinder prior to the test for purposes of comparison. The cylinder of potassium permanganate totally encapsulated with a thick coating of paraffin wax showed essentially no loss of potassium permanganate during the six month run of the test, as illustrated in FIG. 6. In a separate test, a pellet of completely encapsulated potassium permanganate was immersed in water for several days with no signs of potassium permanganate being released from the pellet.

Figure 7:
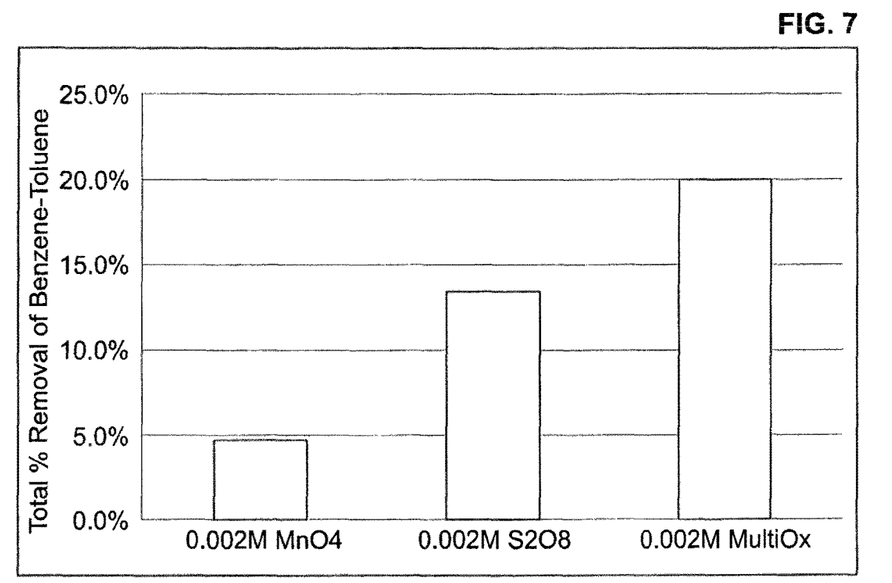
FIG. 7 is a chart illustrating the relative effectiveness of sustained release oxidant blends at 0.002M concentration on the removal of benzene-toluene.
Figure 8:
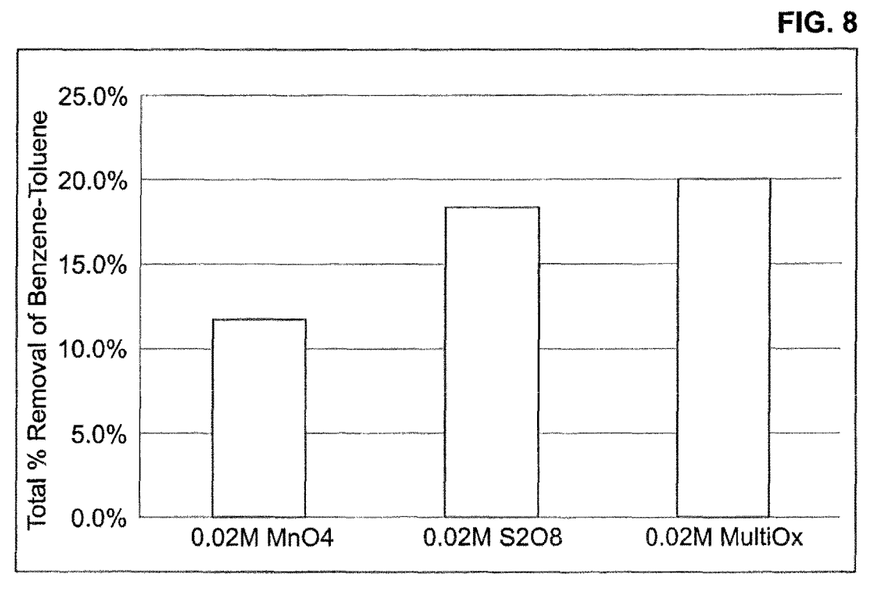
FIG. 8 is a chart illustrating the relative effectiveness of sustained release oxidant blends at 0.002M concentration on the removal of benzene-toluene.

In addition to the enhanced permanganate release rates there could be unexpected reactivity that arises due to the presence of both oxidants that could be potentially beneficial for contaminants that are relatively non-reactive to permanganate (e.g., benzene, carbon tetrachloride). As illustrated in FIGS. 7 and 8, the MULTIOX cylinders of the present invention show enhanced 24 hour mass removal of benzene-toluene mixtures from deionized water. The MULTIOX cylinders were prepared as described in Example 1. As shown in FIGS. 7 and 8, a MULTIOX cylinder increased the total percent removal of benzene-toluene at 0.002 molar concentration and 0.02 molar concentration, respectively, compared to cylinders containing either permanganate or persulfate at the same concentrations.

Combined use of reactive amendments (or "reactants") for water treatment has been increasing because of more stringent drinking water regulations. Examples of this practice include combining chlorine dioxide and chlorine in pretreatment; chlorine dioxide and chlorine in pretreatment with chloramines in the distribution system and chlorine dioxide pretreatment and ozonation to lower bromate concentrations. In addition to reducing contaminants, combined use of reactants for odor control could provide a synergistic benefit for water treatment by combining a sulfide-reducing reagent with an oxidant for sulfide.

In addition to applying the combined reactants using the sustained release practice to in situ and ex situ remediation applications, the process of combining reactants that are capable of controlling hydrogen sulfide for wastewater applications in a slow-release paraffin wax matrix is also of interest. $H_2S$ is a toxic and potentially lethal gas found in both industrial installations and in wastewater systems. Most odor-control solutions for wastewater treatment systems treat the source of odors on a temporary basis but do not prevent the bad odor from coming back, and as a result require repeated dosing. The wastewater pre-conditioning is based on establishing an anoxic biology within the wastewater treatment system. In the presence of nitrate(s), sulfate metabolism is inhibited, thus preventing formation of hydrogen sulfide. In addition to odor issues, the presence of sulfuric acid within the wastewater collection system results in detrimental corrosion of concrete pipes. Accordingly, spraying embodiments of the present invention onto the walls of pipes may be useful in inhibiting corrosion.

1) In some embodiments the compound(s) would be capable of removing a portion of one or more undesirable components in a wastewater stream. For example, calcium nitrate may be effective in reducing hydrogen sulfide by inhibiting the reduction of sulfates by sulfate-reducing bacteria, thus mitigating hydrogen sulfide formation.

2) In a second embodiment, applying a source of oxygen (for example, calcium peroxide) to a wastewater stream to encourage an alternative metabolic pathway so that bacteria present would reduce the compound rather than sulfate could be beneficial. This could be accomplished by introducing a sustained release form of oxygen into the wastewater stream.

3) In a third embodiment for industrial wastewater applications where heavy metal removal is desired, reactive amendments in a sustained release form that initiate pH control and subsequent precipitation and immobilization of metals would be beneficial. This could include addition of soluble reactants such as lime or polyphosphates to form insoluble metal hydroxides or metal phosphates.

4) A variety of biocides are used in the oil and gas industry to control the growth of bacteria and prevent the formation of harmful byproducts of their growth (such as hydrogen sulfide). In a fourth embodiment, sustained release forms of a soluble reactive amendment (i.e., inorganic oxidizers) would be useful to inhibit microbial growth.

Enhanced synergistic reaction kinetics with use of the MULTIOX cylinders of the present invention and the resultant degradation of a variety of contaminants is of concern as illustrated in Table 2. The enhanced removal is a consequence of: 1) increased oxidant concentrations at multiple time steps, 2) extended release of persulfate over longer periods of time, and 3) the presence of multiple oxidants, allows for oxidative treatment of co-mingled mixtures of a variety of contaminants. For example, permanganate alone is less effective in oxidizing the contaminant benzene but very effective in oxidizing toluene. This is important because many gas stations have petroleum hydrocarbon contamination present in the form of BTEX (i.e., benzene, toluene, ethylbenzene, and xylene). The presence of persulfate in MULTIOX allows for treatment of all BTEX compounds and other favorable synergies with other compounds are likely.

TABLE 2

Coupling Oxidation Kinetics with Observed $KMnO_4/Na_2S_2O_8$ Release

10-days

|  | $KMnO_4$ Release Concentration at 10-days (mg/L) | $Na_2S_2O_8$ Release Concentration at 10-days (mg/L) | $t_{1/2}$ 1,4-dioxane (days) | $t_{1/2}$ Benzene (days) | $t_{1/2}$ Toluene (days) | $t_{1/2}$ EthylBenzene (days) | $t_{1/2}$ Xylene (days) |
|---|---|---|---|---|---|---|---|
| 2.5" $MnO_4$ Cylinder | 1000 | — | 25.1 | 181.1 | 2.2 | 0.17 | 0.81 |
| 2.5" $S_2O_8$ Cylinder | — | 500 | 86.8 | 49.4 | 32.3 | 31.9 | 64.3 |
| 2.5" MultiOx Cylinder | 1750 | 2250 | 8 | 1.1 | 0.5 | 0.1 | 0.4 |

30-days

|  | $KMnO_4$ Release Concentration at 30-days (mg/L) | $Na_2S_2O_8$ Release Concentration at 30-days (mg/L) | $t_{1/2}$ 1,4-dioxane (days) | $t_{1/2}$ Benzene (days) | $t_{1/2}$ Toluene (days) | $t_{1/2}$ EthylBenzene (days) | $t_{1/2}$ Xylene (days) |
|---|---|---|---|---|---|---|---|
| 2.5" $MnO_4$ Cylinder | 750 | — | 33.5 | 241.4 | 2.9 | 0.2 | 1.1 |
| 2.5" $S_2O_8$ Cylinder | — | 4500 | 9.6 | 0.6 | 0.4 | 0.4 | 0.8 |
| 2.5" MultiOx Cylinder | 1250 | 1500 | 11.67 | 2.2 | 0.9 | 0.1 | 0.6 |

50-days

|  | $KMnO_4$ Release Concentration at 50-days (mg/L) | $Na_2S_2O_8$ Release Concentration at 50-days (mg/L) | $t_{1/2}$ 1,4-dioxane (days) | $t_{1/2}$ Benzene (days) | $t_{1/2}$ Toluene (days) | $t_{1/2}$ EthylBenzene (days) | $t_{1/2}$ Xylene (days) |
|---|---|---|---|---|---|---|---|
| 2.5" $MnO_4$ Cylinder | 600 | — | 41.9 | 301.8 | 3.7 | 0.3 | 1.4 |
| 2.5" $S_2O_8$ Cylinder | — | 1250 | 34.7 | 7.9 | 5.1 | 5.1 | 10.2 |
| 2.5" MultiOx Cylinder | 750 | 1000 | 18.3 | 5.4 | 1.7 | 0.2 | 1 |

Figure 9:
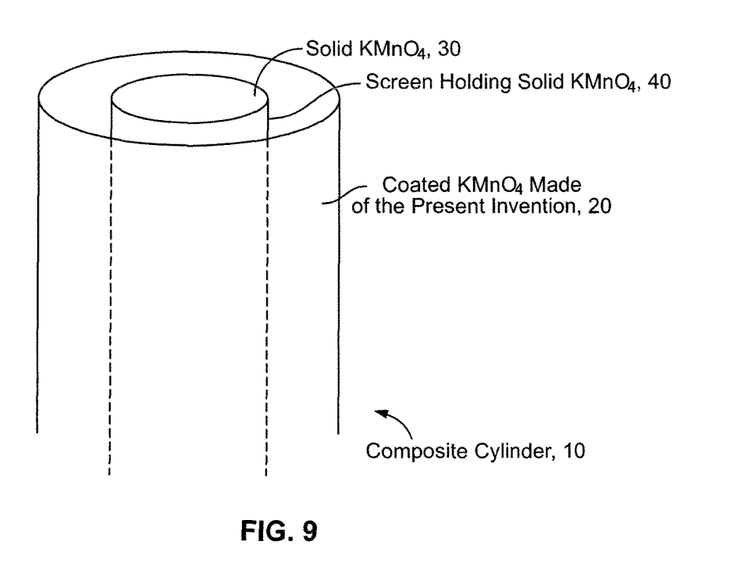
FIG. 9 is a schematic illustrating the construction of a composite cylinder of the present invention.

Embodiments of the open structure coated reactants of the present invention may be used in composite cylinders as illustrated in FIG. 9. Such slow-release composite cylinders 10 comprise, for example, coated potassium permanganate 20 and are designed to release an essentially constant flux of potassium permanganate at late-stage release. The composite cylinder 10 comprises two regions: an inner cylindrical core of solid potassium permanganate 30 surrounded by an annular region of a coated potassium permanganate 20 made to have an open structure consistent with the principles of the present invention. The inner cylindrical core 30 is separated from the coated potassium permanganate 20 by a screen 40. The screen 40 may be made from stainless steel, PVC, cardboard or other materials. As the annular ring of coated potassium permanganate 20 dissolves towards the inner core 30, the rate of potassium permanganate release will decrease. Once the dissolution reaches the inner core of solid potassium permanganate 30, the release rate will be constant until all mass has been released from the inner core 30.

Figure 10:
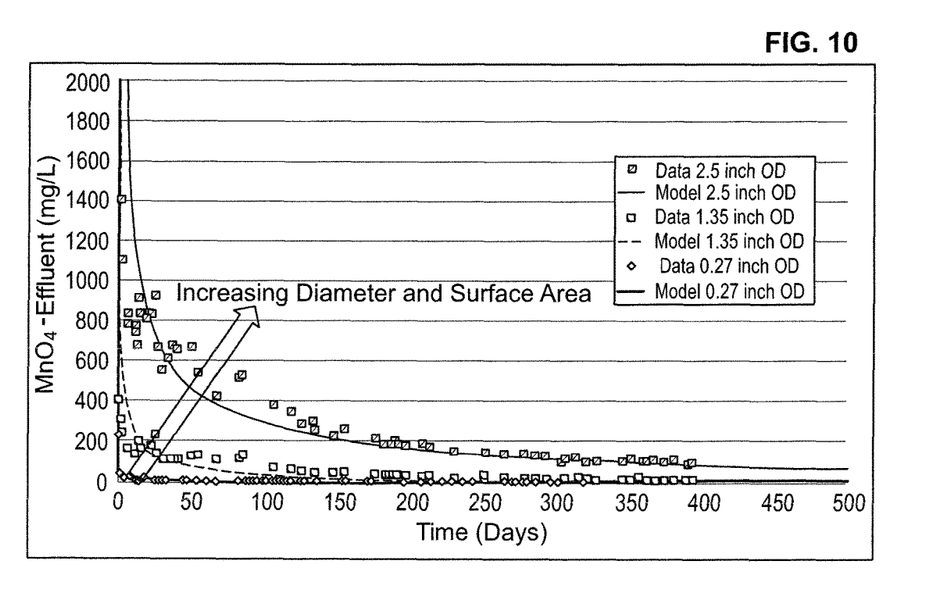
FIG. 10 is a chart illustrating the effect of increasing the surface area on reactant sustained release.
Figure 11:
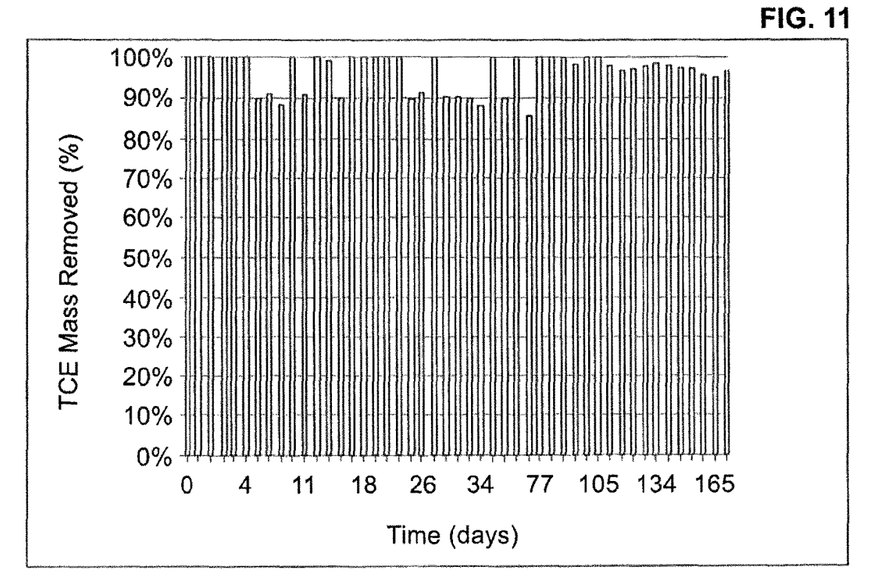
FIG. 11 is a chart illustrating oxidant release and trichlorethylene removal as a function of increased surface area.

Referring now to FIGS. 10 and 11, the data provides evidence of long-term sustained oxidant release that is enhanced by increased surface area. The cylinder used in the test to produce the data of FIG. 10 contained 80% $KMnO_4$. The cylinder in FIG. 10 was subjected to deionized water at a flowrate of 0.5 mL/minute. The cylinder was 2.5 inches in diameter and one inch long. As demonstrated, the release of $KMnO_4$ was sustained for more than one year. The data shown in FIG. 10 demonstrates that by increasing the surface area of the open structured matrix of the present invention, by increasing the diameter of the cylinder at a constant concentration of $KMnO_4$ in the cylinder, the release of $KMnO_4$ surprisingly temporally extended. Persons of ordinary skill in the art would expect that an increase in surface area of the matrix would increase the release rate of a reactant because of the increased exposure to contaminant containing fluids. However, as shown herein, surprisingly and increase in surface area of the reactant blends of the present invention extends or prolongs the release of the reactants over time. FIG. 11 demonstrates that a cylinder of the present invention (2.5 inch diameter by one inch long) effectively removes 0.7 ppm of trichlorethylene ("TCE") over a 165 day period. In the experiment which produced the data for FIG. 11 the cylinder was exposed to water containing 0.7 ppm flowing at a rate of 0.6 mL/minute at room temperature.

Figure 12:
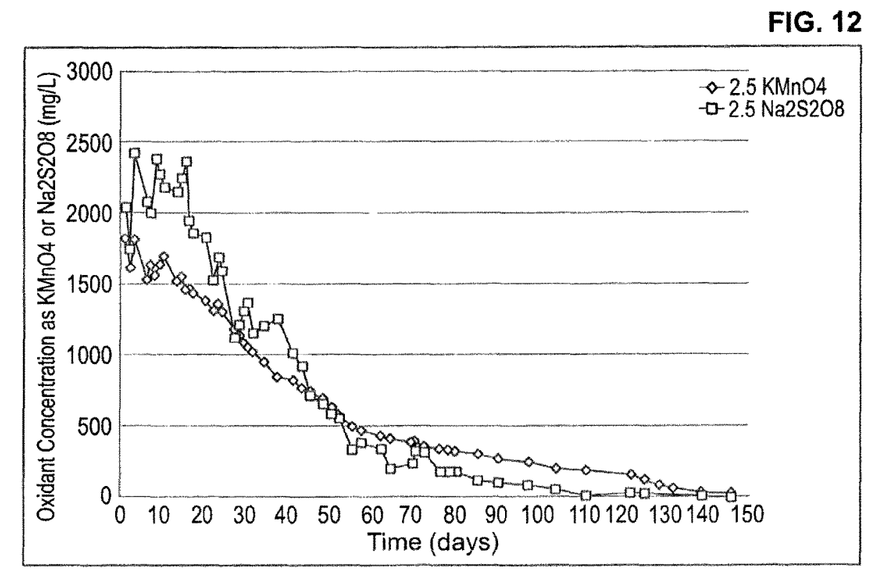
FIG. 12 is a chart illustrating is a chart illustrating the release of potassium permanganate and sodium persulfate from a cylinder made according to the methods of the present invention, the cylinder including a 50:50 blend of potassium permanganate and sodium persulfate.

Referring now to FIG. 12, a 2.5 inch diameter by one inch long cylinder of the present invention was subjected to a flowrate of deionized water of 0.6 mL/minute. The cylinder contained 40% KMnO4, 40% Na2S2O8, and 20% paraffin. As shown, the cylinder of the present invention showed a sustained release of reactants for 148 days.

Table 3 below illustrates that cylinders of the present invention release on-half or less of the reactants contained therein after 50 days. The cylinders tested were 2.5 inch by one inch diameter cylinders in a paraffin matrix. The cylinders were then subjected to flowing deionized water applied at 0.5 mL/minute. Surprisingly, reactant blends of the present invention demonstrate sustained release well in excess of one month.

TABLE 3

Release Characteristics of Reactant Blends of the Present Invention

| Blend composition (%) | Elapsed Time (days) | % Permanganate released |
|---|---|---|
| Permanganate (80%)-Matrix (20%) | 50 | 27% |
| Permanganate (40%)-Persulfate (40%)-Matrix (20%) | 50 | 43% |
| Permanganate (60%)-Persulfate (40%)-Matrix (20%) | 50 | 50% |

Figure 13:
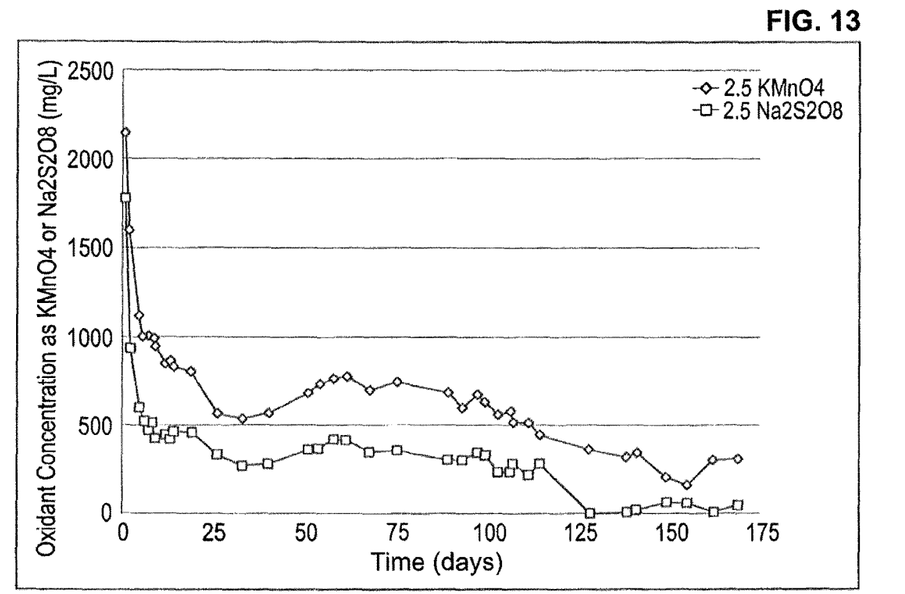
FIG. 13 is a chart illustrating is a chart illustrating the release of potassium permanganate and sodium persulfate from a cylinder made according to the methods of the present invention, the cylinder including a 75:25 blend of potassium permanganate and sodium persulfate, respectively.

Referring now to FIG. 13, a 2.5 inch diameter by one inch long cylinder of the present invention was subjected to a flowrate of deionized water of 0.5 mL/minute. The cylinder contained 60% KMnO4, 20% Na2S2O8, and 20% paraffin. As shown, the cylinder of the present invention showed a sustained release of reactants for 171 days.

Figure 14:
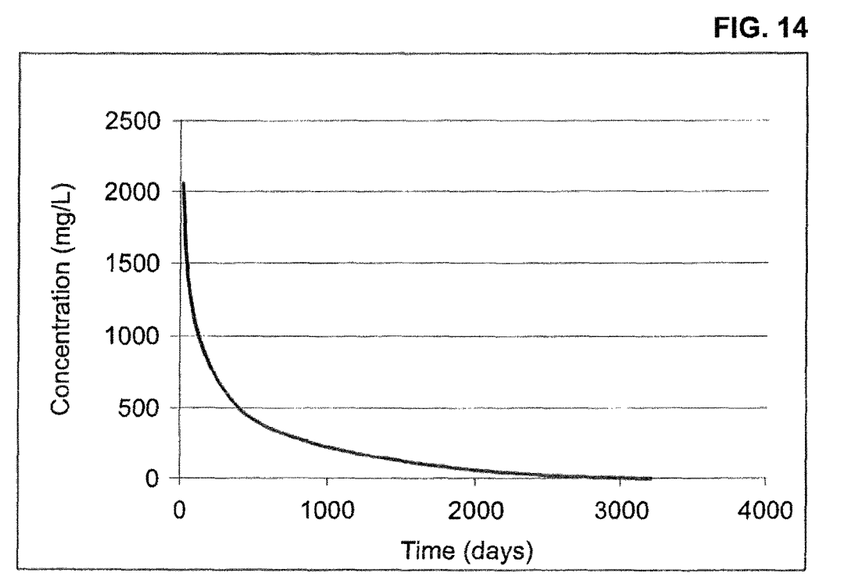
FIG. 14 is a chart illustrating the longevity of oxidant release from a sustained release cylinder.

As further shown in FIG. 13, the reactant release data from a single oxidant cylinder was applied to a model to predict the longevity of release for a reactive material. The simulation results predict a sustained release of oxidant in excess of 2 years. It is expected that combined reactants of the present invention will maintain release of reactants in excess of one year, given the release data in FIG. 14.

There has been provided, in accordance with the present invention and the embodiments thereof, a combined reactant in an insoluble or soluble matrix for removal of contaminants of concern for in situ or ex situ remediation of soil and groundwater, as well as drinking water and wastewater applications. There has been further provided in accordance with the present invention a coated combined oxidant comprising potassium permanganate and sodium persulfate in a paraffin matrix, the paraffin matrix having an open structure and the coated combined oxidant exhibiting enhanced oxidation as compared to either oxidant alone. There has also been provided a method for making a coated combined reactant such that the coating has an open structure and does not completely encapsulate the reactants.

While the invention has been described with specific embodiments, many alternatives, modifications and variations will be apparent to those skilled in the art, in light of the foregoing description. Accordingly, it is intended to include all such alternatives, modifications and variations within the spirit and scope of the appended claims.

We claim:

1. A sustained release reactant blend for treating a medium containing a contaminant, the sustained release reactant blend comprising:
    a porous engineered shape comprising:
        a first reactant;
        a second reactant; and
        a matrix, wherein at least one of the first and second reactant is incompletely coated by the matrix to form an incompletely coated reactant;
    wherein the porous engineered shape is defined by an open structure such that the medium and contaminant can flow into the open structure and contact the incompletely coated reactant; and
    wherein the first reactant and the second reactant provide for a sustained reactant release over a time period that is at least five months.

2. The sustained release reactant blend of claim 1, wherein the first reactant is potassium permanganate.

3. The sustained release reactant blend of claim 1, wherein the first reactant is sodium persulfate.

4. The sustained release reactant blend of claim 1, wherein the matrix is insoluble and biodegradable.

5. The sustained release reactant blend of claim 1, wherein the sustained reactant release increases when a surface area of the sustained release reactant blend is increased.

6. The sustained release reactant blend of claim 1, wherein the matrix is paraffin wax.

7. The sustained release reactant blend of claim 6, wherein the paraffin wax provides a coating for the first reactant and the second reactant such that the sustained release reactant blend is an open structured mass.

8. The sustained release reactant blend of claim 7, wherein the sustained reactant release increases when a surface area of the sustained release reactant blend is increased.

9. A process for making a combined sustained release reactant having a porous engineered shape, the process comprising:
    selecting a first reactant;
    selecting a second reactant;
    preparing a matrix, the prepared matrix capable of coating the first reactant and the second reactant;
    combining the first reactant, the second reactant, and the prepared matrix by mixing in a mixing vessel using an agitator to make a combination; and
    forming the combined sustained release reactant into the porous engineered shape;
    wherein the combined sustained release reactant has an open porous structure;
    wherein at least one of the first and second reactant is incompletely coated by the matrix; and
    wherein the first reactant and the second reactant provide for a sustained reactant release over a time period that is at least five months.

10. The process of claim 9, wherein the first reactant is potassium permanganate.

11. The process of claim 9, wherein the first reactant is sodium persulfate.

12. The process of claim 9, wherein the matrix is paraffin wax.

13. The process of claim 9, wherein the sustained reactant release increases when a surface area of the combined sustained release reactant is increased.

* * * * *